April 7, 1964   P. PASCHAKARNIS   3,128,088
HYDROPNEUMATIC SUSPENSION UNIT
Filed March 21, 1961   2 Sheets-Sheet 2
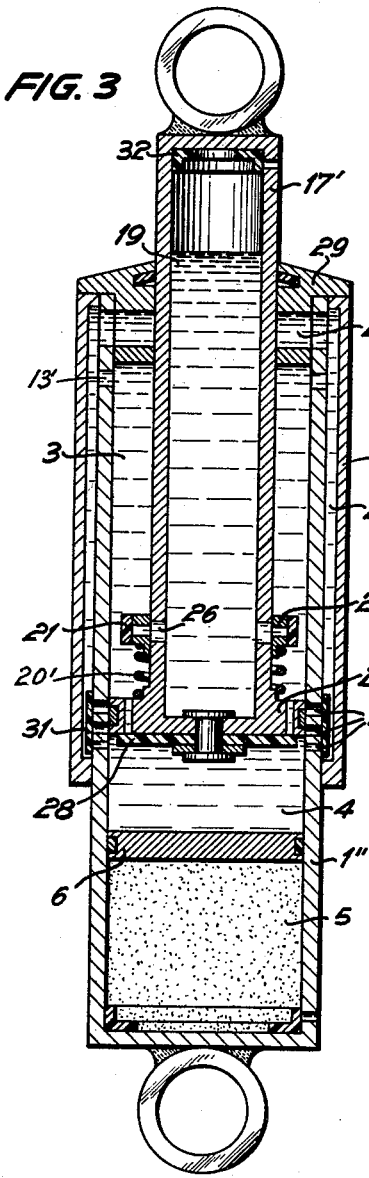
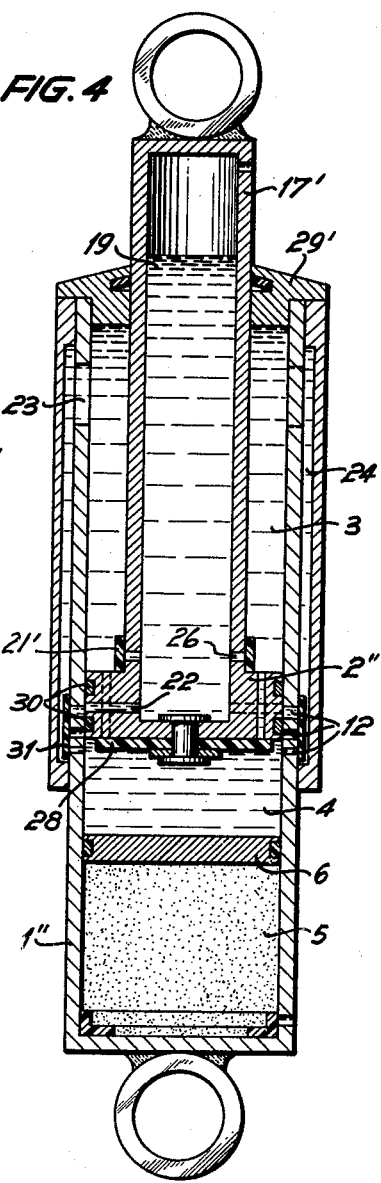
INVENTOR
Peter Paschakarnis

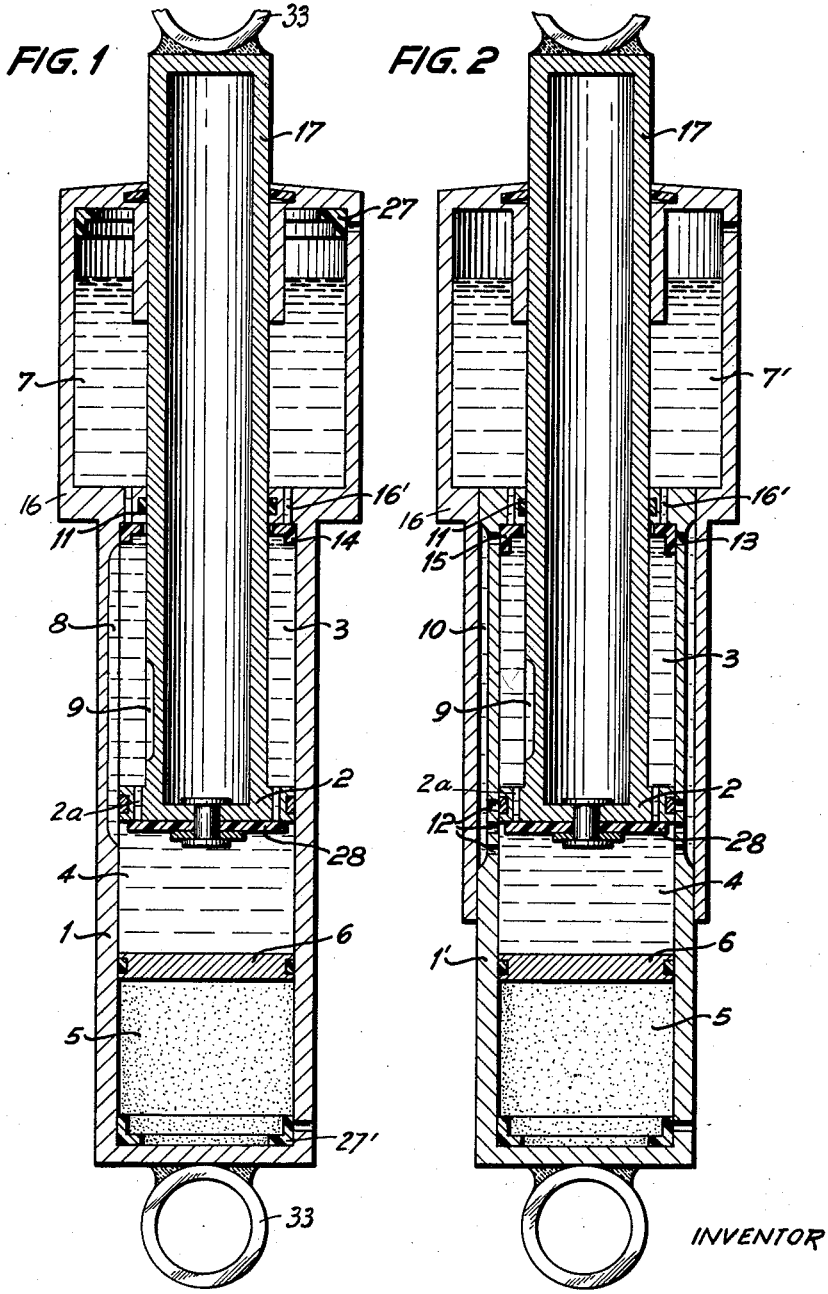

United States Patent Office 3,128,088
Patented Apr. 7, 1964

3,128,088
HYDROPNEUMATIC SUSPENSION UNIT
Peter Paschakarnis, Schweinfurt (Main), Germany, assignor to Fichtel & Sachs A.G., Schweinfurt (Main), Germany, a corporation of Germany
Filed Mar. 21, 1961, Ser. No. 97,238
Claims priority, application Germany Apr. 1, 1960
11 Claims. (Cl. 267—64)

This invention relates to hydropneumatic suspension units, and more particularly to a hydropneumatic spring suspension unit which simultaneously acts as a shock absorber and an automatic leveling device for use in automotive vehicles and the like.

Automatic leveling devices are intended, for example, to maintain the road clearance of a vehicle at a constant value regardless of static or dynamic loading. Some known devices of this type are relatively complex, and thus expensive in first cost and relatively costly to maintain in good operating condition. Others, relatively simple in design, lack the rapid response and ability to operate under unfavorable conditions which is desirable in an automotive self-leveling device.

It is the general object of this invention to provide a suspension unit of the type described which overcomes the shortcomings of the several known types of such units.

A primary object is the provision of a very simple suspension unit which is inherently sturdy and inexpensive to build and maintain, also not apt to fail nor to require maintenance work.

Another object is the provision of a suspension unit which will respond quickly to changes in level of a vehicle frame and the like regardless of the rate at which the level change takes place.

A further object is the provision of a suspension unit which may be readily adapted or adjusted for different damping effects.

An additional object is the provision of a suspension unit which has desirable spring characteristics, and will promptly and vigorously expand in response to compression by static or dynamic loading so that the unit will be fully effective when mounted on a vehicle traveling over longitudinally undulating road surfaces, so-called washboard surfaces.

With these and other objects in view, as will hereinafter more fully appear, and will be more particularly pointed out in the appended claims, reference is now made to the following description taken in connection with the accompanying drawings in which:

FIG. 1 shows a side-elevational axially sectional view of a preferred first embodiment of the invention;

FIG. 2 illustrates a modification of the apparatus of FIG. 1 in a corresponding view;

FIG. 3 shows a third embodiment of the invention in side-elevational axial section; and FIG. 4 is a corresponding view of a modification of the apparatus of FIG. 3.

Referring now to the drawing in detail, and first to FIG. 1, there is shown a suspension unit of the invention having an outward appearance very similar to a conventional type of automotive shock absorber of the dash-pot type. The basic elements of the unit are a cylinder 1 and a piston 2 axially slidable in the cylinder 1. The piston separates the cylinder cavity into two liquid-filled portions the size of which varies inversely as the piston moves up and down in the cylinder as viewed in FIG. 1. The annular space above the piston will be referred to as the "pump space" or "pumping space" 3, and the cylindrical space under the piston as the "pressure space" 4. The latter is axially contained between the piston 2 and an axially slidable piston member 6 which separates the pressure space from a gas cushion 5 maintained at high pressure, and also occupying part of the cylinder cavity. The gas cushion 5 provides a pneumatic spring which maintains a desired pressure in the liquid-filled pressure space 4. It will be understood that the piston member 6 may be replaced by a resilient membrane member circumferentially fastened to the walls of the cylinder 1, but capable of flexing axially under the pressures applied.

A liquid reservoir 7 is secured to or integral with the cylinder 1. It is of approximately cylindrical shape and coaxial with the cylinder 1. Its diameter is somewhat greater than that of the cylinder 1. A hollow piston rod 17 of cylindrical shape is attached to the piston 2. It passes through the pumping space 3 and the liquid reservoir 7, and has a free end outside the reservoir. Its passage through the wall 16 separating the cylinder 1 and reservoir 7 is sealed by a gasket 11, and a similar gasket is provided in the external wall of the reservoir 7.

The internal wall of the cylinder 1 has several grooves 8 of which one only is seen in FIG. 1, and which extend in an axial direction from the separating wall 16 over approximately one half of the total length of the cylinder cavity. The grooves taper slightly in depth from the wall 16 toward the piston member 6, and their end portions are tapered more strongly.

Similar grooves 9 of which again only one can be seen in FIG. 1 are provided in the portion of the piston rod 17 adjacent the piston 2. Their length is approximately three times the thickness of the wall 16.

The wall 16 is formed with several bores 16' which extend from the reservoir 7 to the pumping space 3 and are blocked in the space 3 by a check valve arrangement which permits liquid to pass from the reservoir 7 toward the pumping space 3 only, but not in the opposite direction. The check valve essentially consists of a ring 14 of resilient material and of L-shaped cross section, the two legs of the L being respectively formed by a flat annular disc and a low cylinder. The disc portion of the check valve 14 blocks passage of fluid from the pumping space 3 through the bores 16', but does not substantially interfere with flow in the opposite direction.

A similarly constituted filling valve 27 blocks outward flow of liquid from a portion of the reservoir 7 remote from the wall 16, but permits the liquid in the reservoir to be replenished under pressure to make up for leakage losses and the like. It is not essential that the reservoir 7 be sealed from the atmosphere since it may operate at ambient pressure in the manner illustrated in the similar apparatus illustrated in FIG. 2.

The piston 2 has a plurality of circumferentially spaced axial passages 2a which extend from the pumping space 3 toward the pressure space 4 and are selectively blocked in the pressure space 4 by a valve disc 28 of resiliently flexible material which is centrally fastened to the piston 2. The circumferential portions of the valve disc 28 are moved toward and away from the orifices of the passages 2a by the flowing liquid, and thus prevent flow from the pressure space to the pumping space through the passages 2a.

A filling valve 27' substantially identical with the afore-described valve 27 permits the gas of the gas cushion 5 to be replenished and its pressure to be adjusted. Annular fastenings 33 on the opposite ends of the cylinder 1 and the piston rod 17 provide means for interposing the suspension unit of FIG. 1 between the sprung and unsprung portions of a vehicle in the usual manner.

The afore-described apparatus operates as follows:

When the piston 2 is in the position illustrated in FIG. 1 in which the grooves 8 constitute conduits connecting the pumping space 3 with the pressure space 4, the reciprocating movements of the piston 2 caused by relative movement of the sprung and unsprung mass provoke a normal spring reaction. The overall elastic force is determined by the diameter of the piston rod 17, that is the difference of the effective areas of the piston faces in the pressure space 4 and the pumping space 3, and the liquid pressure in the pressure space 4.

When the piston 2 travels inward of the cylinder 1 until it overtravels the end of the grooves 8 so that the communication channel between the spaces 3 and 4 is interrupted, the expansion of the pumping space 3 causes liquid to be drawn through the conduits constituted by the bores 16' and the valve 14 from the reservoir 7 into the pumping space 3. The elastic force resisting movement of the piston 2 past the lower end of the grooves 8, as viewed in FIG. 1, is determined by the liquid pressure in the pressure space 4 and the total cross sectional area of the piston 2.

When upon reduction of the load the piston 2 is moved outward of the cylinder 1 by the stored energy of the gas cushion 5, the valve disc 28 yields to the increasing pressure in the pumping space from which liquid can escape through the passages or conduits 2a toward the pressure space 4 only. When the piston 2 passes the lower ends of the grooves 8, the pressure in the pumping and pressure spaces is equalized, and further outward movement of the piston 2 is actuated by the pressure of the gas cushion 5 acting on an effective piston area equal to the diameter of the piston rod 17.

Upon continued outward movement of the piston 2, the grooves 9 eventually provide a by-pass conduit around the check valve 14 which permits liquid to return from the pumping space 3, and thereby also from the pressure space 4, to the reservoir 7.

The resulting loss of pressure in the pressure space 4 together with the external load initiates inward movement of the piston 2 in the cylinder 1, and the connection between the reservoir 7 and the pumping space 3 is interrupted when the liquid in the latter and in the pressure space 4 reaches an amount precisely determined by the fixed dimensional relationships of the elements of the suspension unit, and by the adjustable pressure of the gas cushion 5. It will be appreciated that the operating characteristics of a suspension unit of the invention may be varied or adjusted to meet specific conditions by changing the length of the grooves 8 and 9 which may be either lengthened or shortened by adding or removing material. The grooves 9 are preferably spaced slightly from the piston 2 so that the reservoir 7 does not communicate with the pumping space 3 when the piston reaches its outermost position. Such an arrangement facilitates filling and replenishing of the gas supply in the cushion 5, and of the liquid supply in the reservoir 7.

The suspension unit illustrated in FIG. 2 is similar in many respects to that shown in FIG. 1 and functions in substantially the same manner. The cylinder 1' is not equipped with internal axial grooves, but its outer face is turned down over a portion of its length to provide a cavity which forms an annular conduit 10 together with an outer sleeve which is integral with the liquid reservoir 7'. The conduit 10 communicates with the pressure space 4 by a plurality of radial apertures 12 arranged in several axially spaced circumferential rows, and decreasing in diameter in the direction of inward movement of the piston 2 in the cylinder 1'. The apertures 12 are arranged on a level corresponding approximately to that of the lower end of the grooves 8 in FIG. 1, and for the same purpose.

The conduit 10 communicates with the pumping space 3 through circumferentially distributed radial openings 13 adjacent the wall 16 and normally closed by the cylindrical portion of a check valve 15 similar to the afore-described check valve 14. Liquid may thus pass through the openings 13 in a direction from the conduit 10 to the pumping space only. In all other respects the suspension of FIG. 2 is identical with that shown in FIG. 1.

It also operates in a closely similar manner. Damping of the outward movement of the piston 2 is determined by the flow resistance of the passages 2a in the piston 2 only, and damping of the inward piston movement depends in its magnitude on the dimensions of the conduit 10 and of the apertures 12 and openings 13. This arrangement permits the outward movement of the piston to be damped more intensely than the inward movement as is desirable for many applications, and the damping effects during inward and outward movement may be balanced by suitably dimensioning the effective cross sections of the liquid columns the flow of which is controlled by the valves 15 and 28.

A structurally simplified modification of the suspension unit of FIG. 2 is illustrated in FIG. 3. A separate liquid reservoir is dispensed with, and the liquid, usually hydraulic fluid, is stored within the hollow piston rod 17'. Communication between the hollow interior 19 of the piston rod 17' and the other spaces in the suspension unit is established by means of radial openings 26 in the lower portion of the piston rod 17' near the piston 2'. An axially slidable valve member 20 is normally held over the outer orifice of the openings 26 by a helical compression spring 20' which is coaxial with the piston rod 17' and abuts against the annular face of the piston 2' in the pumping space 3. The valve member 20 is formed with outward openings which are covered by a resilient check valve 21 which permits liquid flow under a pressure differential in a direction outward of the reservoir 19 only.

In the absence of a separate liquid reservoir, the top of the cylinder 1" is closed by a plug-like cover 29 formed with wide transverse bores 25 aligned with corresponding bores in the cylinder 1" the purpose of which will become presently apparent. An annular duct 24 is formed around a longitudinal portion of the cylinder 1" adjacent the cover 29 by a sleeve 7". It openly communicates with the pumping space 3 by radial openings 13' in the cylinder 1", and with the pressure space 4 by rows of radial apertures 12. Passage of liquid through the latter apertures is limited to the radial outward direction, from the pressure space 4 toward the pumping space 3 by a sleeve 31 of elastic material slipped over the apertures. A filling valve 32 is provided on the piston rod 17' for replenishing its liquid content.

The operation of the suspension unit of FIG. 3 does not basically differ from that of the embodiments of the invention shown in FIGS. 1 and 2. The piston 2' when moving inward or outward of the cylinder 1 passes through the three distinct stages outlined above.

In the first stage the piston 2' is below the radial apertures 12. In the second stage it is between the apertures 12 and the radial openings 13' so that liquid may flow between the pressure space 4 and the pump space 3 in one direction through the duct 24 and in the other direction through the passages 2a, depending on the direction of piston movement. The third position is reached from that shown in FIG. 3 after the valve member 20 abuts against the cover 29 during outward piston movement, whereby the spring 20' is compressed and the openings 26 are eventually aligned with the aforementioned transverse bores 25. Liquid may return from the pressure space 4 through the radial apertures 12, the duct 24, the bores 25 and the radial openings 26 to the reservoir 19.

When the piston 2' moves downward beyond the apertures 12, liquid is drawn from the hollow interior 19 of the piston rod 17' into the pumping space 3 through the valve 21. During the subsequent outward stroke of the piston 2', liquid is pumped from the pumping space 3 through the valve 28 into the pressure space 4.

The embodiment of the invention illustrated in FIG. 4 differs from that shown in FIG. 3 mainly by the arrangement for drawing liquid from and returning it to the reservoir 19 in the hollow piston rod 17'. The piston 2" is equipped with two axially spaced piston rings 30 which sealingly engage the interior wall of the cylinder 1″. A plurality of radial bores 22 have orifices in the cylindrical piston face between the rings 30 and in the hollow interior 19 of the piston rod. When the piston during its outward travel reaches the position in which it is desired to bleed liquid from the pumping and pressure spaces of the cylinder 1″ into the reservoir 19, the orifices of the bores 22 are aligned with passages 23 in the wall of the cylinder 1″ near the plug-like cover 29′ and permit liquid to flow from the pressure space 4 through the apertures 12, and the duct 24 into the reservoir 19. Alignment between the radial bores 22 and the apertures 12 during inward movement of the piston 2″ may permit some liquid to reach the pumping space 3 from the reservoir 19, but generally, such liquid flow will pass through openings 26 and a check valve 21′ arranged on the piston rod 17′ near the piston 2″.

The operation of the apparatus of FIG. 4 is so closely similar to that of the afore-described embodiments of the invention that those skilled in the art will not require an explicit detailed description.

The hydropneumatic suspension unit of the invention consists of a limited number of movable elements which are rugged and of simple shapes. The piston of the hydropneumatic spring also serves as the piston of the pump which supplies additional hydraulic fluid as required. The entire apparatus is not substantially costlier than an ordinary shock absorber, and not materially more complex in its structure.

The elastic properties of the unit are highly desirable because of the division of the stroke of piston movement into three distinct parts in which the liquid in the pressure space 4 is (a) constant, (b) augmented by pump action, and (c) reduced by return bleeding into a reservoir. The power stroke of the pump occurs during period (a), thereby increasing the spring force of the unit during the terminal portion of the inward stroke of the piston. The outward movement of the piston is actuated by the full inherent spring force of the unit without energy being consumed by the pump, thus ensuring rapid response and leveling action of the unit.

The gradual decrease in cross section of the groove 8 and of the effective flow section of the axial conduit 10 and of the axial duct 24 in a downward direction toward the gas cushion 5 provides a transition without shock between the several parts of the piston stroke.

Many modifications of the suspension unit of the invention will readily suggest themselves to those skilled in the art on the basis of these teachings. The relative positions of the several fluid filled spaces may, for example, be interchanged. The several embodiments have been described in a position in which the piston rod attachment is on a higher level than the cylinder attachment, but this position may be altered, and terms such as "above" and "below" have been employed largely for the purposes of explanation. The unit of FIG. 1, for example, may readily be inverted, and modified for operation in the inverted position by extending the passages 2a in an axial direction outward of the wall 16. The arrangement illustrated, though, is preferable because of its simplicity.

It will be understood that the foregoing disclosure relates to preferred embodiments of the invention only, and that numerous modifications or alterations may be made therein without departing from the spirit and the scope of the invention as set forth in the appended claims.

What I claim is:

1. In a suspension unit, a cylinder member having an axis and defining a cavity therein; a piston member axially reciprocable in said cylinder member and dividing said cavity into a pressure space and a pump space; a liquid substantially filling said spaces; resilient means for maintaining the liquid in said pressure space under a predetermined pressure greater than atmospheric pressure; a liquid reservoir; two check valve means respectively interposed between said pump space and said pressure space, and between said pump space and said reservoir for selectively admitting liquid from said pump space to said pressure space when the pressure in said pump space exceeds the pressure in said pressure space, and for admitting liquid from said reservoir to said pump space when the pressure in said reservoir exceeds the pressure in said pump space, said valve means respectively blocking passage of liquid between said pressure space and said pump space when the pressure in said pressure space exceeds the pressure in said pump space, and blocking passage of liquid between said pump space and said reservoir when the pressure in said pump space exceeds the pressure in said reservoir; passage means connecting said pressure space and said pump space, said passage means including a conduit extending between said pump space and said pressure space, and having an orifice in said pump space, and check valve means in said conduit for passage of liquid through said conduit in a direction from said pressure space to said pump space only; means on said piston member for interrupting connection of said spaces by said passage means when said piston member moves inward of said pressure space past a predetermined position; and attaching means on each of said members outside said cavity.

2. In a suspension unit, in combination; a cylinder member having an axis and defining a cavity therein; a piston member axially reciprocable in said cavity and dividing the same into a pressure space and a pump space; piston rod means secured to said piston means in said pump space and extending outward therefrom; attaching means on said cylinder member and on the outwardly extending portion of said piston rod means for inward movement of said piston rod means into said cavity by an attached load, and outward movement against said load; a liquid substantially filling said spaces; resilient means for maintaining the liquid in said pressure space under a predetermined elevated pressure; one-way valve means in said piston member for passage of liquid from said pump space toward said pressure space; a liquid supply; a first conduit connecting said liquid supply and said pump space; one-way valve means in said first conduit for passage of liquid from said liquid supply toward said pump space; a second conduit having two orifices in said cavity respectively arranged adjacent the outward axial end portion of said cavity and intermediate the two axial end portions thereof; and a third conduit having an orifice in said liquid supply and arranged to communicate with said pump space when said piston member is positioned in said outward axial end portion of said cavity.

3. In a unit as set forth in claim 2, means for limiting the axial movement of said piston member in said cavity to a predetermined stroke, the orifices of said second conduit in said cavity being axially spaced a distance smaller than said stroke.

4. In a unit as set forth in claim 2, one-way valve means in said second conduit for passage of liquid from said pressure space toward said pump space.

5. In a unit as set forth in claim 2, the flow section of said second conduit decreasing in a direction from said pump space toward said pressure space.

6. In a unit as set forth in claim 2, said third conduit being at least in part provided on said piston rod and movable therewith.

7. In a unit as set forth in claim 6, said liquid supply being axially adjacent said pump space.

8. In a unit as set forth in claim 6, said piston rod means being hollow, and said liquid supply being enclosed in said hollow piston rod means.

9. In a unit as set forth in claim 8, valve means in said third conduit, and abutment means on said cylinder member for opening said valve means in said third conduit when said piston member is positioned in said outward axial end portion of said cavity.

10. In a unit as set forth in claim 2, said piston member having opposite radially extending faces in said pressure space and said pump space respectively, said face in said pump space being annularly arranged about said piston rod and smaller than said face in said pressure space.

11. In a suspension unit, in combination:
(a) a cylinder member having an axis and defining a cavity therein;
(b) a piston member axially reciprocable in said cylinder member and dividing said cavity into a pressure space and a pump space,
   (1) said piston member having respective radially extending opposite faces in said spaces, the effective area of the piston member face in said pressure space being greater than the effective area of the opposite piston member face in said pump space;
(c) a liquid substantially filling said spaces;
(d) resilient means for maintaining the liquid in said pressure space under a predetermined pressure greater than atmospheric pressure;
(e) a liquid reservoir;
(f) two check valve means respectively interposed between said pump space and said pressure space and between said pump space and said reservoir for selectively blocking passage of liquid between said pressure space and said pump space when the pressure in said pressure space exceeds the pressure in said pump space, and for blocking passage of liquid between said pump space and said reservoir when the pressure in said pump space exceeds the pressure in said reservoir;
(g) attaching means on each of said members outside said cavity;
(h) passage means connecting said pressure space and said pump space; and
(i) means on said piston member for interrupting connection of said spaces by said passage means when said piston member moves inward of said pressure space past a predetermined position, said cylinder member being formed with an axially extending groove radially open to said cavity, constituting said passage means and extending axially in a direction from said pump space to a portion of said cavity radially aligned with said predetermined position of said piston member.

References Cited in the file of this patent
UNITED STATES PATENTS

| | | |
|---|---|---|
| 2,436,573 | Heynes | Feb. 24, 1948 |
| 2,564,790 | Orloff | Aug. 21, 1951 |
| 2,946,582 | Martin | July 26, 1960 |
| 2,980,418 | Doetsch | Apr. 18, 1961 |